United States Patent Office 3,402,151
Patented Sept. 17, 1968

3,402,151
STORABLE ONE-PART POLYSULFIDE COMPOSITION CONTAINING ZEOLITIC MOLECULAR SIEVES
Edward F. Kutch, Trenton, N.J., assignor to Thiokol Chemical Corporation, Bristol, Pa., a corporation of Delaware
No Drawing. Filed June 1, 1966, Ser. No. 554,344
8 Claims. (Cl. 260—77.5)

ABSTRACT OF THE DISCLOSURE

A stable, curable liquid polythiopolymercaptan polymer containing zeolitic molecular sieves.

---

This invention relates to an improved liquid polysulfide polymer composition. More particularly, this inveniton relates to one part, stable, curable liquid polysulfide polymer compositions which contain zeolitic molecular sieves which impart exceptionally long package stability to the composition.

Polysulfide polymers such as disclosed, for example, in U.S. Patents 1,890,191, 2,206,641, 2,206,642, 2,100,351, and 2,216,044, and especially the liquid polysulfide polymers such as disclosed in U.S. Patents 2,466,963 and 2,789,958 have found a wide variety of applications because of the properties of the cured polysulfide rubber. These polymers have found extensive use as sealants, caulking compounds, adhesives, and the like. Because of the nature of the curing agents for such polymers, for a long period of time it was not possible to compound polysulfide polymer compositions into air-curable, one-part, storage stable, commercially acceptable products. It was therefore necessary to compound the composition immediately prior to use, or to package the ingredients in two parts, one containing the polysulfide polymer and the other containing the curing agent. However, a number of moisture activated one-part polysulfide polymer compositions have now been developed as is shown in U.S. 3,225,017, and in copending U.S. applications Ser. No. 138,123 and Ser. No. 310,925, both now abandoned. These one-part moisture activated compositions, however, have the disadvantage of having relatively short storage stability, i.e., even though the compositions are stored in moisture and air-tight containers after compounding and prior to use, the polysulfide polymer compositions "cure-up" and lose their utility as adhesives, caulking compounds and the like. Because of the relatively short storage stability, these moisture activated polysulfide polymer compositions must be compounded shortly before use of the compositions. This often leads to inconvenience, undue expense and waste. For example, in case the composition is not used within this period of storage stability considerable waste may occur. Efforts to lengthen the storage stability of these moisture activated compositions have to the date of this invention, met in failure. For example, various desiccating agents, have been incorporated in the moisture activated polysulfide polymer composition. In addition the polysulfide polymer composition has been dried very thoroughly before packaging. However, these efforts were not successful since the package stability of these polysulfide polymer compositions remains relatively short.

It is therefore an object of this invention to provide a moisture activated one-part polysulfide polymer composition which is storage stable for relatively long periods of time.

It is another object of this invention to provide such compositions in completely pre-mixed form and suitably packaged in a single container in order that after a relatively long period of storage the composition may be directly deposited in place without the need of power mixers, stirrers and the like.

It is still a further object of this invention to provide such one-part compositions which may be stored for a prolonged period of time in liquid phase and may be cured in place to a tough, resistant elastomer merely by application to the desired site and exposure to the atmosphere.

These and other objects which will be apparent from the disclosure, are accomplished by incorporating in a moisture activatable one-package polysulfide polymer composition a dehydrated molecular sieve. Molecular sieves in this invention are those such as described in "Chemical Loaded Molecular Sieves" (Form No. F1311) and "Chemical Loaded Molecular Sieves in Rubber and Plastic" (Form No. F1349) published by Linde Company, Division of Union Carbide Corporation (1959), and in U.S. Patent 3,036,980. The molecular sieves used in the process of this invention must not contain any materials which will activate the polysulfide polymer system, as for example moisture and/or basic compounds. Preferably the molecular sieves of this invention contain only dehydrated air. However, it is within the scope of this invention to use chemically filled sieves so long as the chemical within the molecular sieve is not one which will initiate the cure of the polysulfide polymer composition.

It has unexpectedly been found that by the use of molecular sieves in the polysulfide polymer compositions of this invention the package stability of such compositions is increased many times.

One of the especially desirable and unexpected features of this invention is that a moisture activatable polysulfide composition which has not been thoroughly dried and/or contains basic materials attains prolonged package stability by the addition of molecular sieves as described herein. In the past these compositions which had not been thoroughly dried and/or contained basic materials such as amines generally had relatively poor package stability.

The polysulfide polymers upon which the compositions of this invention are based are organic polymeric materials which are liquid at room temperature and which contain recurring polysulfide linkages, i.e., $-(S_n)-$, in the polymeric backbone wherein $n$ is, on the average, about 1.5 to 5. For chain extension and curing purposes these polymers should contain reactive groups such as —SH, —OH, —NH$_2$, —NCO. These polymers include for example, those liquid polythiopolymercaptan polymers as are disclosed, as noted above, in U.S. 2,466,963 and which may be represented by the formula HS(R—S—S—)$_n$ RSH where R is a hydrocarbon, oxahydrocarbon or thiahydrocarbon radical such as the ethyl formal radical (—CH$_2$—CH$_2$—O—CH$_2$—O—CH$_2$—CH$_2$—)

the butyl formal radical

the ethyl ether radical (—CH$_2$—CH$_2$—O—CH$_2$—CH$_2$—)
and the butyl ether radical

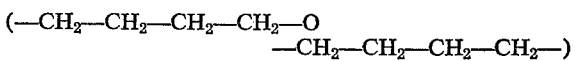

and $n$ preferably will vary about from 4 to 23.

Other polysulfide polymers are the isocyanate terminated polymers such as those disclosed in copending application Ser. No. 310,925 filed Sept. 23, 1963, now abandoned, in the name of E. F. Kutch; "high-rank" (—SSH) terminated polymers such as those disclosed in copending application Ser. No. 290,637 filed June 26, 1963, now abandoned in the name of E. R. Bertozzi; blocked "high-rank" (—SSH) terminated polymers such as those disclosed in copending application Ser. No. 302,724 filed Aug. 16, 1963, now abandoned in the name of E. R. Bertozzi; and amine (—NH₂) terminated polymers such as those disclosed in U.S. 2,606,173 and in Ser. No. 398,422 filed Sept. 22, 1964, in the name of E. R. Bertozzi, now patent No. 3,331,816. These polymers have a molecular weight of about 200 to about 30,000 and are liquid, i.e., pourable, at room temperature (about 25° C.) and preferably have a molecular weight from about 500 to 20,000. In addition they may have about 0.1% to 4% crosslinking. Moreover, the invention is applicable to polymers of lower or higher molecular weight; however the primary advantage of a liquid or semi-liquid starting material lies in the greater ease in handling, application and cure.

The curing agents for the liquid polysulfide polymer which may be used in the sealant compositions of the present invention include all those materials known to the art as liquid polysulfide polymer curing agents such as polyepoxy resins; dinitro benzene; the metal and metal salt peroxides such as lead peroxide, calcium peroxide, barium peroxide, tellurium dioxide, manganese dioxide, sodium carbonate peroxide and zinc peroxide; p-quinonedioxime; zinc oxide; cumene hydroperoxide; the various chromate salts such as are disclosed in U.S. 2,964,503; and the curing agents of U.S. 2,606,173 and the copending applications previously cited. About 1.0 to 10 parts by weight of one or more of such curing agents should be used according to the present invention, per 100 parts by weight of liquid polysulfide polymer being used in the sealant composition. These curing agents may be used singularly or in various combinations with one another.

The curable polysulfide sealant compositions and the primer compositions of the present invention may also contain various types of inert materials commonly employed in polysulfide polymer based sealant and caulking compositions such as adhesive additives such as phenolic and epoxy resins; fillers; plasticizers; pigments; ultraviolet light stabilizers; cure accelerators including the deliquescent accelerating agents such as disclosed in U.S. 3,225,017; perfumes; and the like.

The relative amounts of zeolitic molecular sieve; desiccating, deliquescent accelerating agent; curing agent; and/or other ingredients admixed with the polysulfide polymer may be varied substantially depending upon the molecular weight, chemical structure, and/or terminal groups of the polysulfide polymer; the relative freedom from moisture of the total polysulfide polymer composition; the desired end use of the polysulfide polymer composition, and other factors known to the art. Generally, however, it is desirable that the curing agent is present in at least stoichiometric amounts in order to provide complete cure of the polymer composition. Furthermore, the amount of desiccating, deliquescent accelerating agent should be sufficient to provide a rapid cure upon exposure to moisture, such as moisture in the air. The amount of zeolitic molecular sieve may be varied over wide ranges but will generally be in sufficient amounts to provide a composition with prolonged package stability, but not with such large amounts as to substantially delay the rate of cure upon exposure of the polysulfide polymer composition to moisture. For example, where 100 parts by weight of polysulfide polymer is used having a molecular weight of about 4000, the amount of curing agent will range from about 2 to 20 parts by weight, the amount of desiccating, deliquescent accelerating agent will range from about 0.5 to 50 parts by weight, and the amount of zeolitic molecular sieve will range from about 0.5 to 50 parts by weight.

The following examples are merely illustrative of the present invention and are not intended as a limitation upon the scope thereof.

Examples 1–2

A one-part polysulfide polymer composition containing molecular sieves is compared to a control as to package stability.

| | Parts By Weight | |
|---|---|---|
| | 1 | 2 |
| Polysulfide polymer [1] | 100 | 100 |
| Polyepoxide [2] | 4 | 4 |
| Calcium peroxide | 8 | 8 |
| Titanium dioxide | 45 | 45 |
| Toluene | 8 | 8 |
| Sodium hydroxide | 0.5 | 0.5 |
| Molecular Sieve [3] | | 4 |

[1] Polysulfide polymer having a molecular weight of about 4,000, a viscosity of about 40,000 centipoises, about 0.5% cross-linking, and essentially the structure $$HS(C_2H_4-O-CH_2-O-C_2H_4-SS)_{23}C_2H_4-O-CH_2-O-C_2H_4-SH$$

[2] Bisphenol A-epichlorohydrin type epoxy resin.
[3] Dehydrated zeolitic material marketed as Linde 4A Molecular Sieves.

The ingredients were thoroughly mixed on a paint mill and then placed in an air-tight lead-lined tooth-paste-type tube with a screw cap. The thus filled tubes are stored at 120° F. Periodically some of the material is extruded onto test panels from each of the tubes. A material is considered to have lost its package stability when the material is no longer extrudable. The composition of Example 1 is no longer package stable at 39 days whereas the composition of Example 2 is still package stable at 150 days.

Examples 3–6

Tests on different compositions prepared and tested as in Examples 1 and 2 are summarized as follows, in parts by weight:

| | 3 | 4 | 5 | 6 |
|---|---|---|---|---|
| Parts by Weight: | | | | |
| Polysulfide polymer [1] | 100 | 100 | 100 | 100 |
| Polyepoxide [2] | 8 | 8 | 8 | 8 |
| Barium peroxide | 8 | 8 | 8 | 8 |
| Titanium dioxide | 45 | 45 | 45 | 5 |
| Tris(dimethylaminomethyl)phenol | | | 3 | 3 |
| Ferric chloride | 0.2 | 0.2 | 0.2 | 0.2 |
| Molecular Sieve [3] | | 5 | | 4 |
| Package Stability (days): | | | | |
| Storage at 75° F | 125 | >602 | 92 | 421 |
| Storage at 120° F | 92 | >602 | 92 | 421 |

[1] Polysulfide polymer of Examples 1–2.
[2] An essentially anhydrous solution of 55±1% by weight of solid polyepoxide resin having a melting point of 125–135° C. and an epoxide equivalent value of 2,000–2,500 in a 1:1 solvent mixture of methyl isobutyl ketone and toluene.
[3] Dehydrated zeolitic material marketed as Linde 5A Molecular Sieves.

Examples 7–8

Compositions of the following compositions expressed in parts by weight were compounded in a room having a relative humidity of 8% at a temperature of 78° F. according to the procedure of Examples 1 and 2. The compositions were then tested for package stability as in the previous examples.

| | 7 | 8 |
|---|---|---|
| Parts of Weight: | | |
| Polysulfide polymer [1] | 100 | 100 |
| Chlorinated biphenyl solvent | 40 | 40 |
| Titanium dioxide | 15 | 15 |
| Calcium carbonate | 45 | 45 |
| Molecular Sieve [2] | | 4 |
| Package Stability (days): Storage at 75° C. | 10 | 42 |

[1] Polysulfide polymer containing —NCO pendant groups and made according to the procedure of copending application S.N. 310,925, wherein 1 mole of an uncrosslinked hydroxyl terminated polysulfide polymer having a molecular weight of 2,000 is reacted with two moles of toluene diisocyanate.
[2] Dehydrated crystalline zeolitic molecular sieves marketed as Linde 4A Molecular Sieves.

I claim:

1. A storage stable, curable, unitary, moisture activatable composition comprising a liquid polythiopolymercaptan polymer having in its polymeric chain recurring polysulfide linkages attached to radicals selected from the group consisting of hydrocarbon, oxahydrocarbon, and thiahydrocarbon radicals, and a zeolitic dehydrated molecular sieve free of any materials which will activate said polymer.

2. The liquid polymer of claim 1 containing reactive —NCO groups.

3. The liquid polymer of claim 1 containing reactive —OH groups.

4. The liquid polymer of claim 1 containing reactive —NH₂ groups.

5. A storage stable, curable, unitary, moisture activatable liquid polythiopolymercaptan polymer composition having in its polymeric chain recurring polysulfide linkages attached to radicals selected from the group consisting of hydrocarbon, oxahydrocarbon, and thiahydrocarbon radicals having thoroughly dispersed therein
   (a) a dormant curing agent in an amount sufficient to cure said polymer composition,
   (b) an alkaline desiccating deliquescent accelerating agent, and
   (c) a dehydrated zeolitic molecular agent free of any materials which will activate said polymer.

6. A composition as in claim 5 wherein said curing agent is barium peroxide and wherein said desiccating deliquescent accelerating agent is ferric chloride.

7. A composition as in claim 5 wherein said curing agent is also a desiccating deliquescent accelerating agent and wherein said zeolitic molecular sieve is free of any chemicals which would initiate the cure of said composition upon prolonged storage of said composition in a moisture and airproof container.

8. A composition as in claim 7 wherein said curing agent is calcium peroxide.

References Cited

UNITED STATES PATENTS

| | | | |
|---|---|---|---|
| 3,036,980 | 5/1962 | Dunham et al. | 260—2 |
| 3,215,677 | 11/1965 | Le Fave et al. | 260—79.1 |
| 3,225,017 | 12/1965 | Seegman et al. | 260—79.1 |
| 3,245,946 | 4/1966 | O'Connor et al. | 260—2 |
| 3,275,579 | 9/1966 | Stierli et al. | 260—79.1 |
| 3,282,902 | 11/1966 | Panek | 260—79.1 |

FOREIGN PATENTS 793,780  4/1958  Great Britain.

DONALD E. CZAJA, *Primary Examiner.*

M. I. MARQUIS, *Assistant Examiner.*